Figure 14:
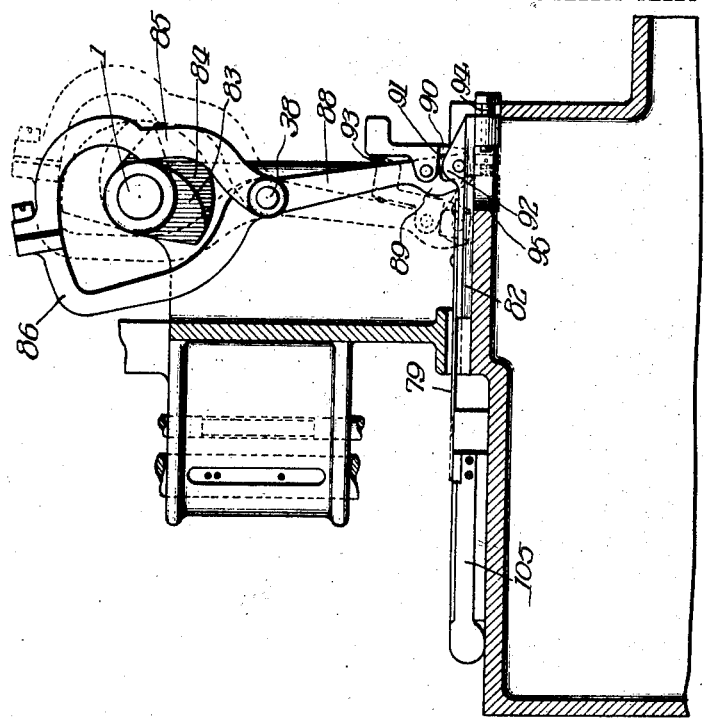

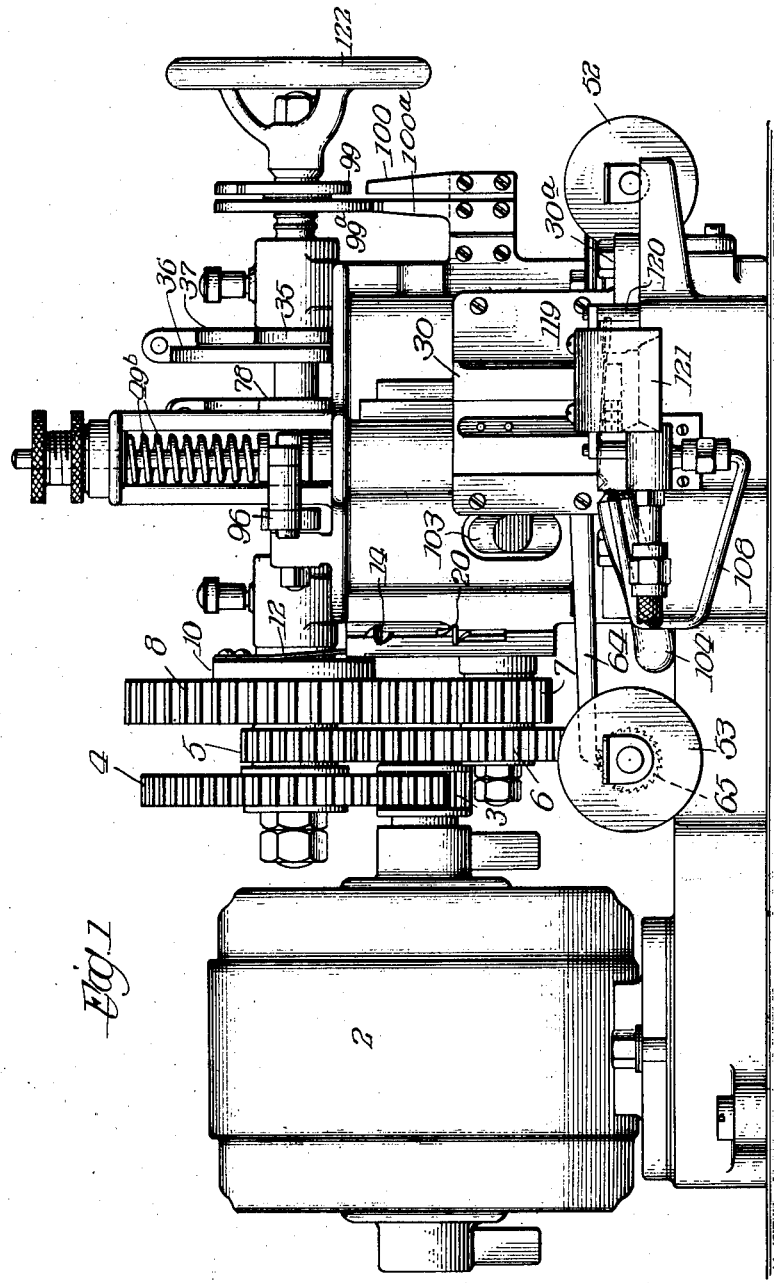

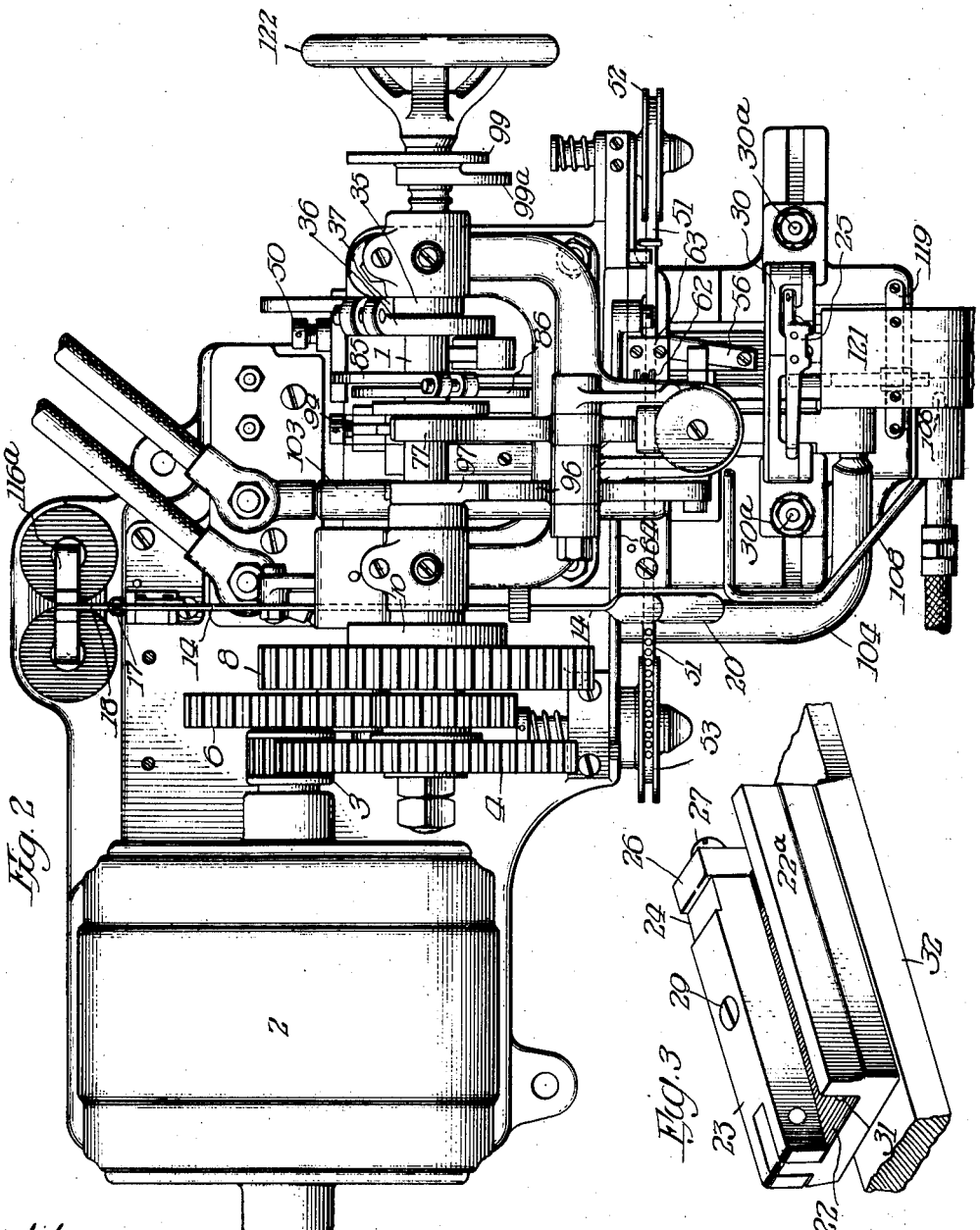

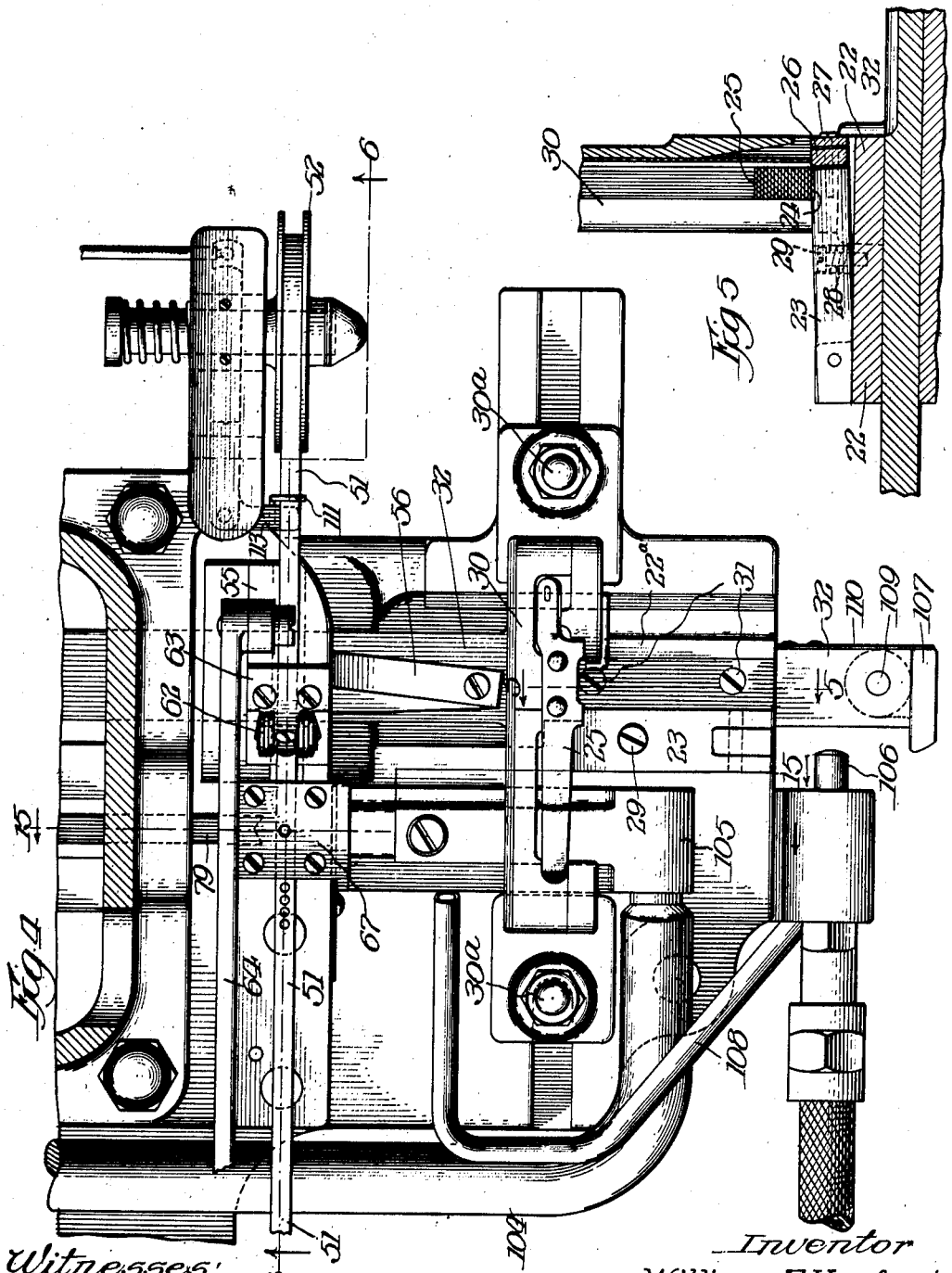

W. F. HOSFORD.
PROCESS AND MACHINE FOR MAKING SWITCH PARTS.
APPLICATION FILED OCT. 12, 1912.
1,090,618.
Patented Mar. 17, 1914.
9 SHEETS—SHEET 4.
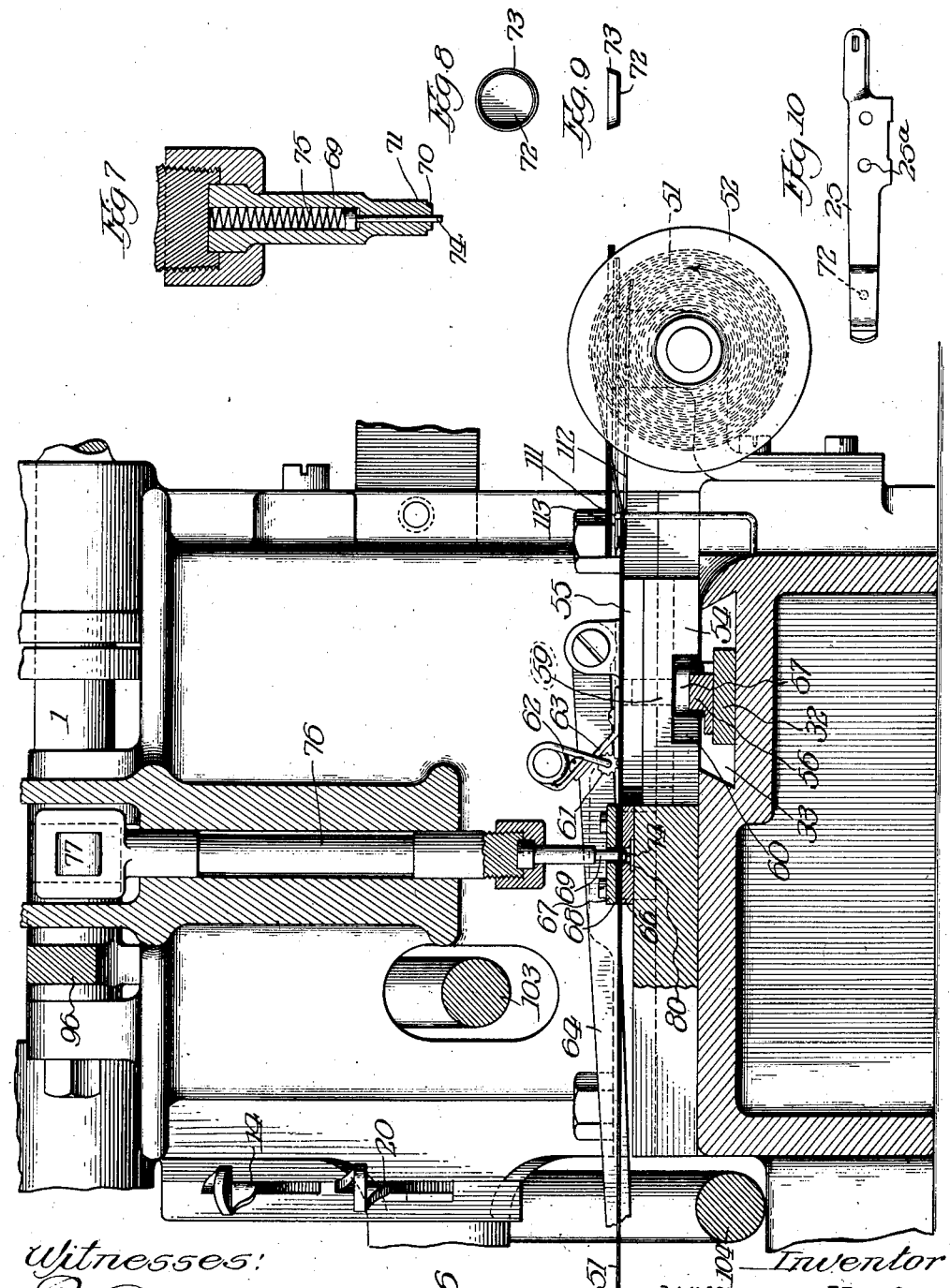

W. F. HOSFORD.
PROCESS AND MACHINE FOR MAKING SWITCH PARTS.
APPLICATION FILED OCT. 12, 1912.
1,090,618.
Patented Mar. 17, 1914.
9 SHEETS—SHEET 5.
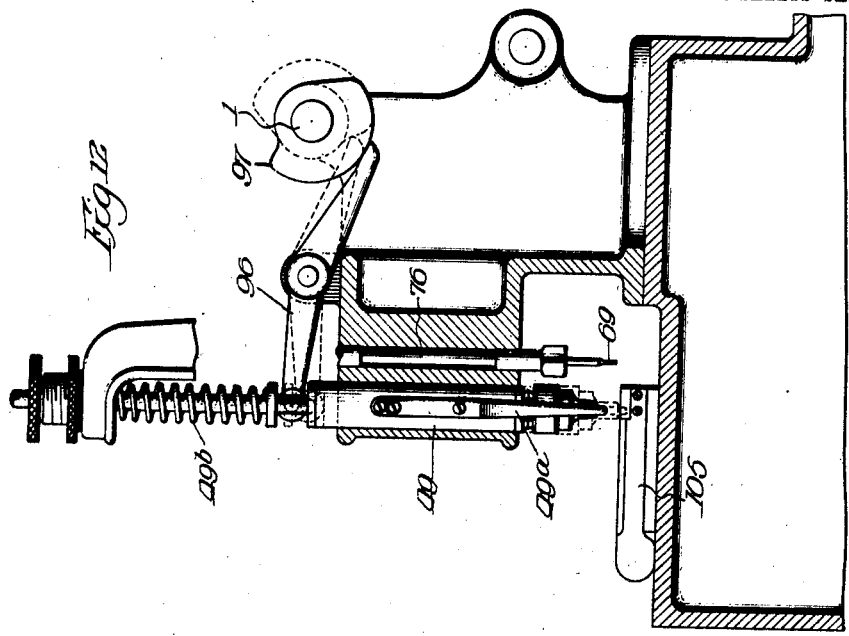
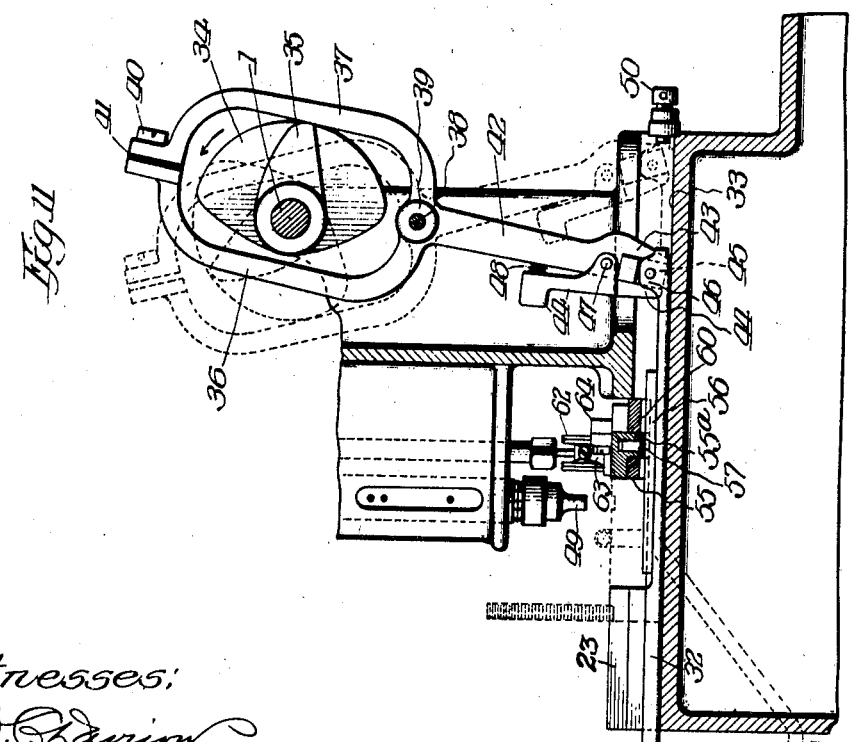
Witnesses:
Inventor
William F. Hosford W. F. HOSFORD.
PROCESS AND MACHINE FOR MAKING SWITCH PARTS.
APPLICATION FILED OCT. 12, 1912.

1,090,618.

Patented Mar. 17, 1914.

9 SHEETS—SHEET 6.

Witnesses:
Geo. C. Davies
W. F. Hoffman

Inventor:
William F. Hosford
By John G. Roberts
Atty.

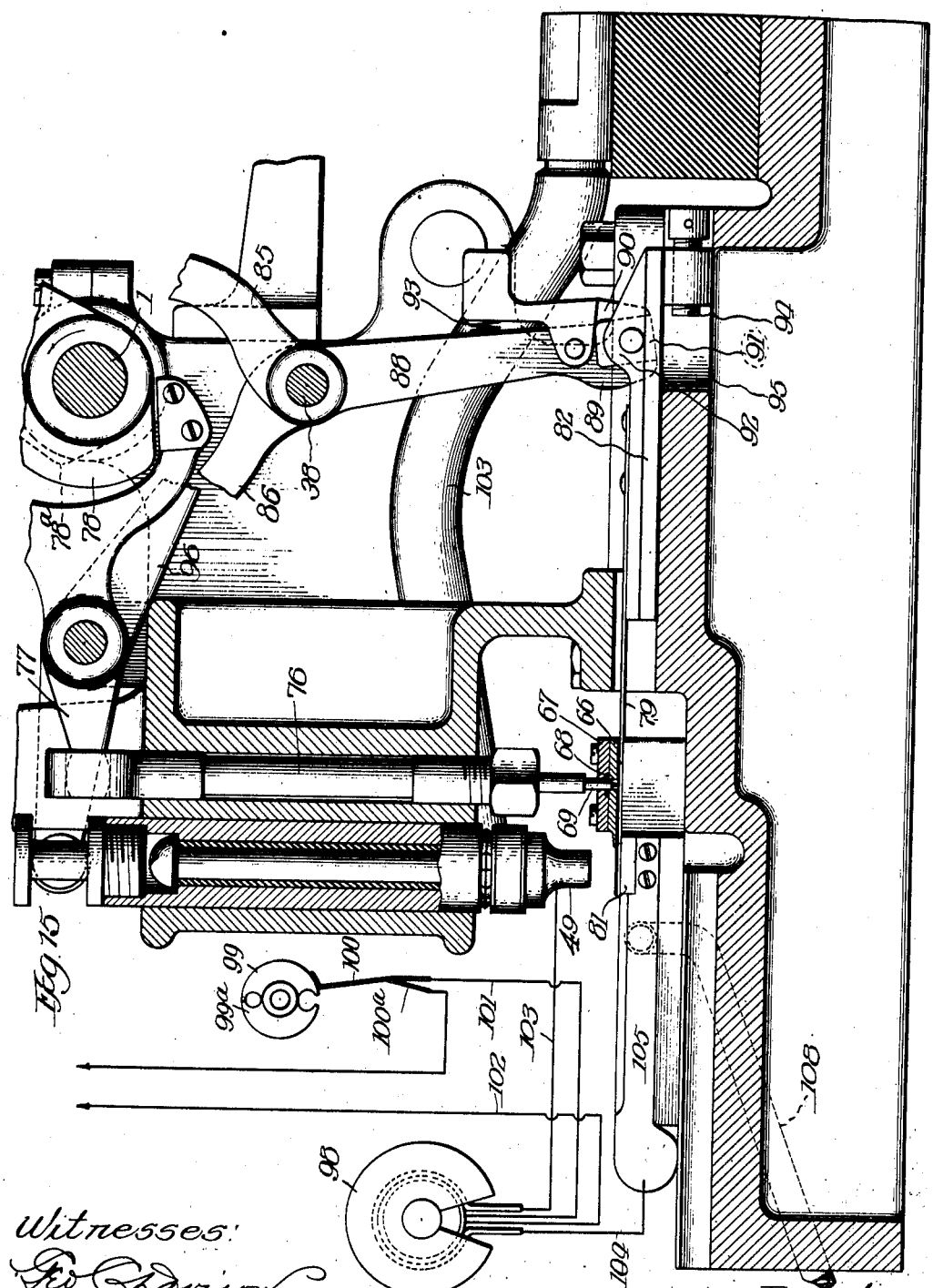

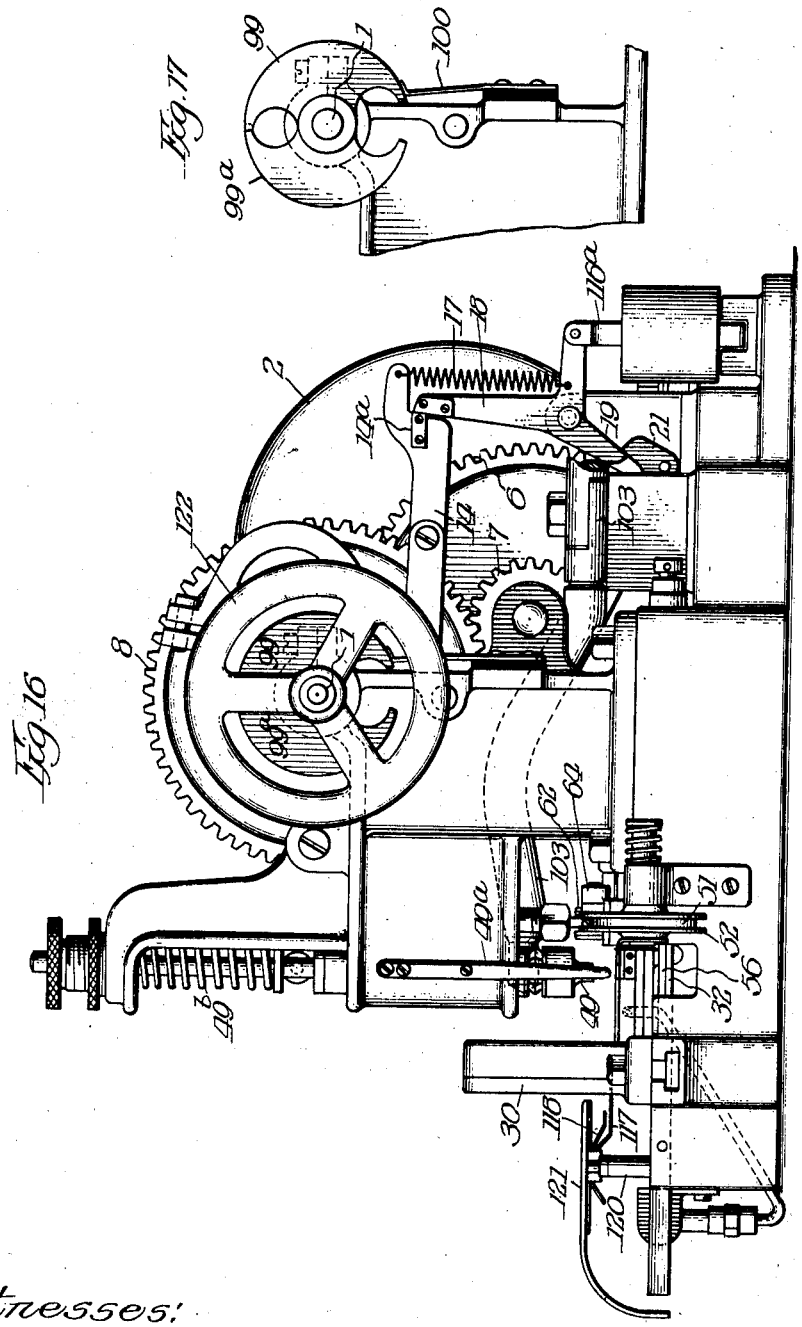

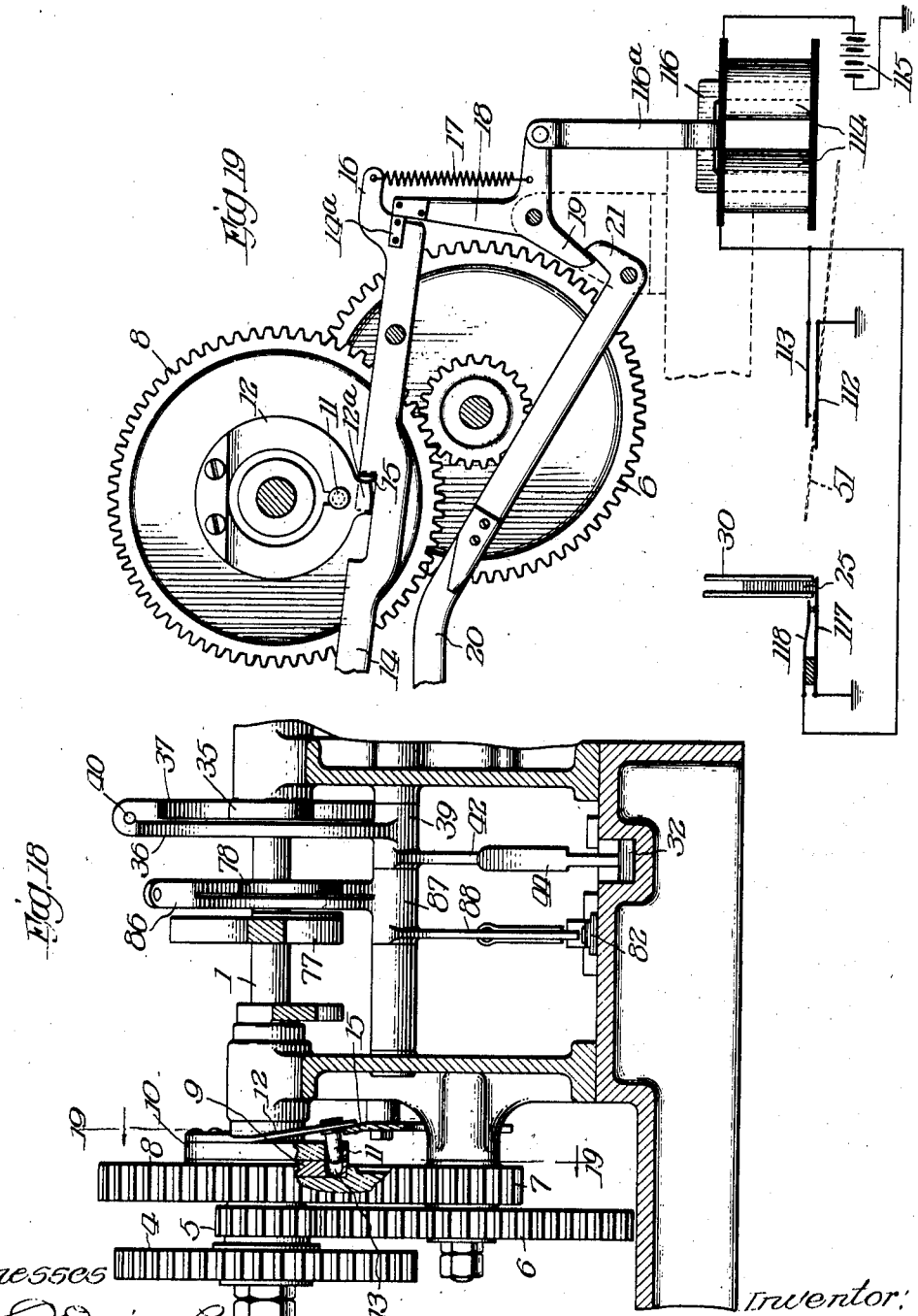

UNITED STATES PATENT OFFICE.

WILLIAM F. HOSFORD, OF CHICAGO, ILLINOIS, ASSIGNOR TO WESTERN ELECTRIC COMPANY, OF NEW YORK, N. Y., A CORPORATION OF ILLINOIS.

PROCESS AND MACHINE FOR MAKING SWITCH PARTS.

1,090,618.      Specification of Letters Patent.    Patented Mar. 17, 1914.

Application filed October 12, 1912. Serial No. 725,532.

*To all whom it may concern:*

Be it known that I, WILLIAM F. HOSFORD, a citizen of the United States, residing at Chicago, in the county of Cook and State of Illinois, have invented a certain new and useful Improvement in Processes and Machines for Making Switch Parts, of which the following is a full, clear, concise, and exact description.

My invention relates to a process of and a machine for electrically welding contacts, as for example platinum disk contacts, to springs or other switch-parts of electrical apparatus.

The object of my invention is to provide means by which contacts may be welded in such manner that uniform results are obtained, and the work done automatically, economically both with respect to material and labor, and with rapidity.

My invention contemplates a sequence of operation in which a small disk or other suitably shaped contact is punched from a strip or ribbon of platinum, or other material suitable for electrical contacts. The switch-part to which the contact is to be affixed and the disk are carried into a superposed relation to each other beneath an electrode plunger which is then lowered. Current is turned on by a commutator and the platinum disk is thereby welded to the switch part. The electrode plunger is then raised, and the carriage returned to its initial position. During the return stroke of the carriage the switch-part is preferably removed therefrom automatically, for example by a blast of air automatically turned on in the return movement of the carriage.

In its preferred form, the machine which I employ for carrying out my invention provides a reciprocating pawl and ratchet like means, or other suitable feed device, for feeding a platinum strip or ribbon beneath a punch which punches out the disks. The end of the punch is so shaped as to provide the disk with an elevated portion, as for example, with a peripheral flange or rim. Means are provided for feeding the disk and the switch-part in superposed relation between electrodes which constitute the terminals of the secondary of a transformer, and the switch-part is pressed against the disk by one of the electrodes, which may be in the form of a plunger. While in this position the primary circuit of the transformer is momentarily closed by means of a switch, and the disk is thereby welded to the switch-part by the resultant flow of current, the heat being localized at the point of contact of the rim, or other elevated portion of the disk, and the switch-part. The carriage upon which the switch-part is supported is then returned to its initial position, ready to receive another piece of work to be operated upon. The switch-part is preferably automatically removed from the carriage. The movement of the carriage, the feed of the platinum ribbon, and the operation of the punch and the electrode plunger may be controlled by a series of cams mounted on a rotary shaft arranged to be driven either continuously or intermittently as desired. The work may be placed on the carriage either automatically or by hand.

The several features of my invention may be more readily understood by reference to the accompanying drawings, in which—

Figure 13:
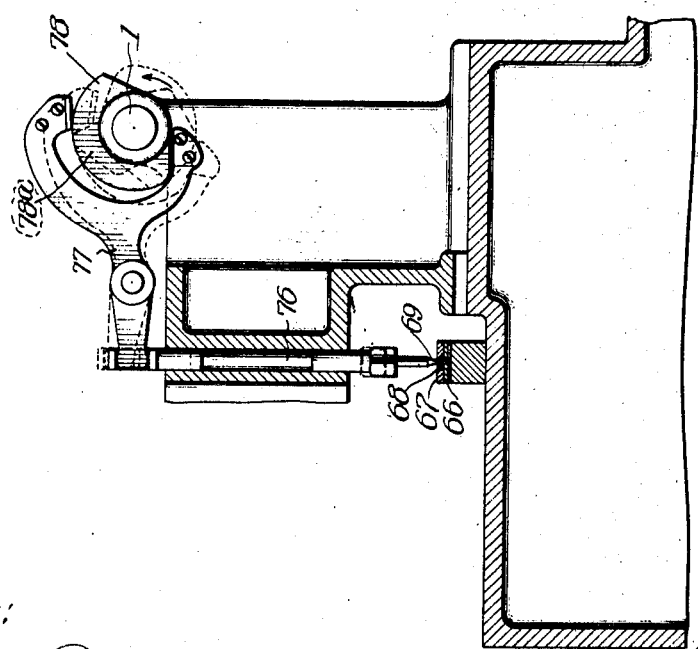

Figure 1 is a front elevation of a machine embodying my invention; Fig. 2 is a plan view of the machine; Fig. 3 is an enlarged, perspective view of the carriage upon which the switch-part is supported; Fig. 4 is an enlarged, fragmentary horizontal section, showing the front portion of the machine in plan, with certain parts of the machine removed for the sake of clearness; Fig. 5 is a section on the line 5—5 of Fig. 4; Fig. 6 is a section on the line 6—6 of Fig. 4; Fig. 7 is a longitudinal section of the punch for blanking and forming the platinum disks; Figs. 8 and 9 are an enlarged plan and a cross-section, respectively, of a platinum disk; Fig. 10 is a plan view of one form of switch-part which is adapted to have a contact disk welded thereto by the machine of my invention; Fig. 11 is a transverse section showing the mechanism by which the spring or other switch-part is carried from the magazine and located beneath the electrode plunger; Fig. 12 is a section showing in side elevation the mechanism for operating the electrode plunger; Fig. 13 is a section showing, in side elevation, the means for operating the disk-forming punch; Fig. 14 is a section showing, in side elevation, the mechanism for locating the platinum disk beneath the electrode plunger; Fig. 15 is a section on the line 15—15 of Fig. 4, and also shows a diagram of the circuits of the transformer; Fig. 16 is an end elevation as viewed from the right hand end of the machine; Fig. 17 is a fragmentary view, in elevation, of the switch for making and breaking the primary circuit; Fig. 18 is a fragmentary, transverse, vertical section showing the clutch arrangement for starting and stopping the machine; and Fig. 19 is a section on the line 19—19 of Fig. 18, and also shows a diagram of circuits whereby the machine may be automatically stopped in case the feed magazine becomes empty or the platinum ribbon from which the disks are punched is used up.

Similar letters of reference refer to similar parts throughout the several views.

The sequence of operation of the machine is controlled by a series of cams secured to a rotary shaft 1. Said shaft may be driven in any suitable manner, and for this purpose there is shown (see Fig. 1) an electric motor 2 geared to the shaft 1 through a series of gear wheels 3, 4, 5, 6, 7 and 8. The gear wheel 8 is loosely mounted on the shaft 1 and the hub 9 of said gear wheel constitutes one member of a clutch, the other member 10 (see Fig. 18) of which is secured to the shaft 1. Referring more particularly to Figs. 18 and 19, the clutch member 10 is adapted to be thrown into operative engagement with the member 9 by a pin 11 which extends though a hole in the member 10. A leaf-spring 12, shown as a collar which surrounds the shaft 1, tends to press the pin 11 into one of the holes 13 in the clutch member 9, and thereby to couple together the two clutch members. Such clutching engagement of the members 9 and 10 is under the control of the two starting levers 14 and 20. The starting levers 14 and 20 so coöperate that they can be set to produce either continuous or intermittent rotation of the cam shaft 1. If it is desired that the cam shaft 1 make one revolution only for each depression of the starting lever 14, as shown in Figs. 18 and 19, the lever 20 is first depressed and held in such depressed position in any suitable manner. The end 21 of the lever 20 then engages the extension 19 of a pivoted stop lever 18 and holds said lever 18, against the tension of a spring 17, out of the path of movement of the end of the lever 14. The spring 17 is secured at one end to an extension 16 of the lever 14 and at its other end is secured to a point beyond the pivotal point of the lever 18. The lever 14 is provided with a laterally extending cam finger 15 which, when the lever is elevated, projects into the path of movement of the radial extension 12ª of the spring 12 and moves said spring outward to the position shown in Fig. 18. Thus assuming that the lever 20 is in the depressed position as shown in Fig. 19, the momentary depression of the lever 14 releases the end 12ª of the spring, whereupon the pin 11 is projected into one of the openings 13, thereby clutching the shaft 1 to the constantly rotating wheel 8. Upon the lever 14 being released, the spring 17 raises the cam finger 15 of the lever 14 into the path of motion of the spring extension 12ª, and when the shaft 1 has made one revolution the extension 12ª rides over the cam finger 15 and draws the pin 11 out of the opening 13, thus uncoupling the clutch. Therefore, when the lever 20 is depressed, the cam shaft 1 makes but one revolution for each depression of the lever 14.

If continuous rotation of the shaft 1 is desired, the lever 20 is raised, and the lever 14 is depressed. The spring 17 then throws the stop lever 18 beneath the end of the stop block 14ª of the lever 14, thus preventing the lever 14 from returning the cam finger 15 to its raised position. With the levers 14 and 20 thus set the clutches 9 and 10 remain coupled together and the cam shaft 1 is continuously driven. Thus, when the lever 14 is operated, the shaft 1 and the various cams carried thereby begin to rotate, the rotation being continuous if the lever 20 is in its raised position, but ceasing at the end of one complete revolution if the lever 20 is in its depressed position.

The switch-part, as for example the switch-spring 25 shown in Fig. 10, to which a contact disk 72 is to be welded is placed upon a carriage or other support (see particularly Fig. 3) preferably consisting of a plate 22, having at one edge a vertical flange 22ª for supporting one end of the spring 25. Pivoted at the opposite edge of the plate 22 is a block 23, having a transverse channel 24 at its rear end for receiving and holding the spring 25. One side of the channel 24 is formed by the end block 26, which is secured to the block 23 by a screw 27. The block 26 may thus be adjusted to regulate the width of the channel 24. The rear end of the block 23 is slightly raised by a spring 28 (see Fig. 5), the extent of such elevation of the block being determined by an adjustable pin 29. The block 23 can thus be adjusted to a proper height with respect to a magazine 30 in which the switch-parts 25 are held.

The plate 22 of the carriage or work-support is removably secured, as for example by screws 31, to a slide 32 which extends from the front to the rear of the machine, and which is located in a slideway 33 (see Fig. 6) formed in the bed of the machine. Thus a work-support 22 suitable for holding the switch-spring 25 shown in Fig. 10 may be removed and a support suitable for holding other work substituted therefor.

Referring more particularly to Figs. 1, 4 and 5, the magazine 30 for holding and automatically feeding the switch-parts 25 to the carriage 22 is preferably divided vertically in order that it may be adjusted for different lengths of switch-parts to be held therein. Each section of the magazine is adjustably mounted upon the bed of the machine by a bolt 30ª.

In the extreme forward position of the work-support or carriage the lowermost switch-part 25, held in the magazine 30, drops into the channel 24 (see Fig. 5). The switch-part is thus automatically fed to the carriage, or, if preferred, the magazine 30 may be removed and the switch-part 25 placed upon the carriage by hand.

The slide 32 is adapted to be given a reciprocatory motion by cams 34 and 35 (see particularly Figs. 11 and 18), located upon the cam shaft 1, and arranged to engage the arms 36 and 37, respectively, of a lever pivoted upon the cross-rod 38. Said lever is provided with a central hub or fulcrum 39 which surrounds the pivot rod 38. The lever arms 36 and 37 extend upwardly from said hub 39, in different planes and upon different sides of the cam shaft 1, being preferably secured together at their upper ends by a screw 40, thus constituting a loop which surrounds the cams 34 and 35. A spacing block 41 may be interposed between the ends of the arms 36 and 37 in order to provide for adjusting the arms to compensate for wear of the lever arms and the cams. The lower end of the lever is in the form of an arm 42 which, at its lower end, is provided with jaws 43, 44 for engaging with a rectangular block 45 which is pivoted between ears 46, 46 of the slide 32. The jaw 43 is integral with the arm 42, and the jaw 44 is pivoted to the arm 42 upon a pivot 47, said jaw being acted upon by a coiled spring 48. Thus, as the shaft 1 and the cams 34 and 35 carried thereby rotate, the lever arm 42 is actuated and imparts a reciprocatory motion to the slide 32.

The machine is shown in position ready to receive the switch-part 25 to which a contact disk is to be welded and ready to commence the cycle of operations required for welding a contact disk upon the switch-part. The switch-part, having been placed upon the carriage either automatically or manually, and motion having been imparted to the cam shaft 1, all in the manner hereinbefore described, said carriage is moved to the rear to bring the end of the switch-part or work 25 centrally beneath the upper electrode plunger 49. This movement of the carriage is caused by the cam 34 engaging with the lever arm 36, as indicated in dotted lines in Fig. 11.

In order to stop the slide 32 in exact position for centering the end of the switch-part 35 beneath the plunger 49, there is provided, at the end of the slideway 33, an adjustable stop-pin 50 (see Fig. 11) which limits the rearward movement of the slide 32. The pivoted jaw 44 permits of a slight rearward motion of the lever arm 42 without any resultant movement of the slide 32 after the end of the slide 32 contacts with the stop pin 50. It will be noted that in this position the spring 48, operating on the jaw 44, is under compression, so that the proper location of the switch-part 25 under the plunger 49 is assured even though there should be some slight lack of adjustment, due to wear or otherwise, between the cam 34 and the lever operated thereby.

It is to be understood that the operation of the machine is so timed, by the various cams located on the cam shaft 1, that a disk is punched during the time that the slide, after one weld is made, is going forward, that is making its return stroke, for the purpose of getting another switch-part for the next weld. While the switch-part is being carried rearward from the magazine to a position below the electrode plunger 49, as above described, such previously formed disk is being carried forward from the die so that both the switch-part 25 and the disk to be welded thereto arrive in their respective superposed positions beneath the plunger 49 at approximately the same time.

The means for feeding the platinum strip 51 to the punch will next be described, reference being had in particular to Figs. 1, 4, 6 and 11.

A coil of platinum ribbon 51 is placed on the spool 52, and, as it is fed therefrom, is wound upon the spool 53 (see also Fig. 2). Mounted upon the bed of the machine, above the slideway 33, is a block 54 which forms a track for the reciprocating feed-carriage 55. Said block 54 has a central slot therein for receiving a tongue 55ª which depends from the carriage 55, it being understood that said slot in the block 54 is of a greater length than the tongue 55 in order to permit of a slight reciprocating movement of the carriage 55. The carriage 55 is adapted to be reciprocated by a cam 56 carried by the slide 32. Straddling the cam 56 is a saddle 57, which is secured by a pin 59 to the feed carriage 55. The block 54 is cut away on its under side, as at 60, to permit of a lateral reciprocation of the saddle 57. Hence, as the slide 32 moves a switch-part beneath the plunger 49, the feed-carriage 55 is moved to the left and during the return stroke of the slide 32 the feed-carriage is moved to the right through the action of the cam 56 upon the saddle 57, which, as stated, is attached to said carriage. During said movement of the carriage 55 to the left, a gripping device upon said carriage seizes the platinum ribbon 51 and feeds the same forward the required amount for supplying material for one disk. Said gripping device consists of a small knurled steel roller 61 carried by a spring 62 and located beneath an inclined bracket 63, mounted on the carriage 55. As the carriage 55 moves to the left, the roller 61 is forced into the angle between the bracket 63 and the carriage and is thus forced into gripping engagement with the platinum ribbon which passes underneath said bracket. The ribbon is thus unwound from the spool 52 and is fed through the die which coöperates with the disk punch, to be described hereinafter. At the same time that the ribbon is unwound from the spool 52 it is wound upon the spool 53 by the action of a stepping pawl 64, which is pivoted to the feed-carriage 55 and engages the teeth of a ratchet wheel 65 secured frictionally to the spool 53. During the movement of the carriage 55 to the right, the roller 61 rides over the ribbon 51 without gripping the same, and the pawl 64 rides over the teeth of the ratchet wheel 65.

Referring more particularly to Figs. 4, 6, 13 and 15, the die through which the platinum ribbon is fed, in the manner just described, comprises a lower plate 66 and an upper plate 67 suitably secured together and upon the bed of the machine, the upper die 67 being provided with a channel 68 (see Fig. 15) for the reception of the platinum ribbon which thus travels over the surface of the lower plate 66. Said plates 66, 67 are provided with alined die openings for the reception of the lower end of the punch 69. Above the point 70 of the punch is a shoulder 71 (see Fig. 7) whereby as a disk is punched from the platinum strip, said disk 72 is provided with a peripheral flange or rim 73 (see Figs. 8 and 9). In other words the end of the plunger 69 is so shaped as to first form a cup after which the shearing shoulder 71 follows through and cuts it off from the ribbon. The end of the plunger may be shaped to punch out any desired shape of contact and to provide the same with any suitable elevated portion adapted to localize the flow of welding current. Obviously, therefore, my invention is not limited to the punching out of a disk with a rim, but includes any other shape of contact formed with an elevated portion. In the center of the punch 69 is a small pin 74 backed up by a spring 75, which pin strips off the disk after it is punched and prevents it from working back into the die as the punch is raised.

The punch 69 is carried upon the end of a plunger 76 (see particularly Figs. 6, 13 and 15) which is adapted to be actuated by a lever 77, the movement of which is controlled by cams 78, 78ª secured upon the cam shaft 1. As soon as the platinum ribbon has been fed the proper amount, as hereinbefore described, and just as the slide 32 completes its return stroke, the plunger 76 is depressed and the punch 69 punches out and forms the platinum disk 72 with the rim up.

After the platinum disk has been punched out, and during the feed-stroke of the slide 32, a slide 79 having a V-shaped notch in its front end is moved through a channel 80 which is provided on the under surface of the lower die plate 66. This slide 79 pushes the patinum disk 72 out from the die and beneath the end of the switch-part 25, which at that time is being located, in the manner hereinbefore described, above the anvil 81 and beneath the electrode plunger 49. The end of the switch-part 25 to which the platinum contact is to be welded is raised a slight distance above the anvil 81 so that the platinum disk can readily pass beneath the switch-part 25. This elevation of the end of the switch-part 25 is brought about by the spring 28 which holds up the block 23 upon which the end of the switch-part is supported.

The means for operating the slide 79 is shown most clearly in Figs. 14 and 15. The rear end of the slide 79 is secured to a slide block 82 which is reciprocated much in the same manner as the slide 32, hereinbefore described. That is, the cams 83 and 84 located upon the cam shaft 1 are arranged to engage the arms 85 and 86, respectively, of a lever pivoted upon the cross-rod 38. Said lever is provided with a hub or fulcrum 87, (see Fig. 18) which surrounds the pivot rod 38. The lever arms 85 and 86 extend upwardly from said hub in different planes and upon different sides of the cam shaft 1, being secured together at their upper ends in the same manner as the lever arms 36, 37 hereinbefore described. The lower end of the lever is in the form of an arm 88 which, at its lower end, is provided with jaws 89, 90 for engaging with a rectangular block 91 which is pivoted between ears 92, 92 of the slide block 82. The jaw 89 is integral with the arm 88, and the jaw 90 is pivoted to the arm 88, said jaw being acted upon by a spring 93. Thus, as the shaft 1 and the cams 83, 84 carried thereby rotate, the lever arm 88 is actuated and imparts a reciprocatory motion to the slide block 82 and the slide 79 carried thereby. In order to stop the slide 79 in exact position for centering the platinum disk beneath the switch-part 35, there is provided upon the underside of the slide block 82 an adjustable stop pin 94 which limits the forward movement of the slide 82 by the engagement of the end of the pin 94 with the front wall 95 of a channel formed in the bed of the machine. The disk is thus properly centered in a manner similar to that hereinbefore described for accurately locating the switch-part 35 beneath the plunger 49.

Referring more particularly to Figs. 12 and 15, as soon as the switch-part 25 and the platinum disk 72 are in superposed relation, as above described, the electrode plunger 49 is lowered.

Secured to the rod of the plunger 49, and extending parallel thereto, is a pilot rod 49ª, which in the particular form shown in the drawings has a tapered end adapted to pass through the hole 25ª in the switch-part 25 and thus insure the proper positioning of said switch-part and at the same time assist in holding the switch-part in place while the weld is being made. The pilot rod 49ª is detachable in order that it may be removed and some other similar device be substituted therefor when a different type of switch-part is operated upon.

A coiled spring 49ᵇ tends to lower the plunger 49. A lever 96, controlled by a cam 97 located on the cam shaft 1 is adapted to hold said plunger 49 in its elevated position until the switch-part 25 and the disk 72 are in position beneath the plunger. Thereupon the cam 97 permits the spring 49ᵇ to lower the plunger 49 and the end of the switch-part 25 is forced down thereby and brought into contact with the rim 73 of the platinum disk. At this time current is turned on the primary of the transformer 98 (shown diagrammatically in Fig. 15). One of the leads 101 from the primary of the transformer includes the switch-springs 100, 100ª, (see also Figs. 1 and 17), and said switch-springs are momentarily closed and current thus turned on the primary of the transformer by means of the slightly overlapping spaced apart commutator segments 99, 99ª, with which the springs 100, 100ª are, respectively, adapted to engage. Said springs are both in engagement with their respective segments, and the circuit consequently closed only at the time the springs are in engagement with the overlapping portions of said segments. The switch-springs 100, 100ª control the circuit of the primary leads 101, 102 of the transformer (see Fig. 15). The lead 103 carries current from the secondary of the transformer to the copper plunger 49, and the other lead 104 from the secondary of the transformer is connected to the electrode block 105 upon which the electrode anvil 81 is secured. The leads 103 and 104, shown diagrammatically in Fig. 15, are shown in Figs. 2, 4, 6, 15 and 16.

As the platinum disk 72 rests on the anvil 81 and the plunger 49 presses against the switch-part 25, current from the secondary of the transformer is passed through the switch-part and the rim of the disk, raising the temperature to the welding point. Both the electrode plunger 49 and the electrode block 105 are suitably insulated from the rest of the machine. As soon as the weld is accomplished, the electrode plunger is raised, and the slide 32, which carries the carriage 22 upon which the switch-part is supported, starts on its return stroke toward the magazine carrying with it the switch-part with the disk 72 welded thereto.

During the return movement of the slide 32 a finger 107 (see Fig. 4), projecting laterally from the front end of said slide, momentarily depresses a plunger 106 which controls the passage of compressed air through the pipe 108. Thereupon a momentary blast of air from the pipe 108 blows the finished switch-part from the carriage 22 and leaves the carriage ready for the reception of another switch-part. The finger 107 is pivoted at 109 upon the end of the slide 32 and is held in position by a spring 110 which permits of the finger 107 riding over the plunger 106 without operating the same during the rearward movement of the slide.

Preferably means are provided whereby the machine is automatically stopped when all of the platinum ribbon 51 is fed from the spool 52. Referring more particularly to Figs. 4, 6 and 19, the platinum ribbon 51, as it leaves the spool 52, passes beneath a finger 111 and over a switch-spring 112 which is held by the ribbon 51 out of contact with the superposed spring 113. As shown diagrammatically in Fig. 19, the switch-springs 112 and 113 control the circuit of the solenoids 114. When said switch-springs are closed, current flows from the grounded battery 115 or other suitable source of current, through said solenoids 114, the switch-springs 113 and 112 to ground or other suitable return conductor. The energization of the solenoids 114 causes the yoke-shaped plunger cores 116 thereof to be drawn down, thus, through the medium of the link 116ª, withdrawing the stop lever 18 from beneath the end of the stop block 14ª of the lever 14, thereby permitting the spring 17 to throw the lever 14 in position to release the clutch mechanism, as hereinbefore described. It is thus apparent that when the end of the ribbon 51 passes beyond the switch-spring 112 the mechanism, with the exception of the lever 20, will be caused to assume the position shown in Fig. 19. It thus appears that the solenoids 114 are adapted to perform automatically the same function that is accomplished by lowering the lever 20. Such automatic stopping mechanism is desirable only when the machine is set for continuous operation.

A device similar to that just described may be employed for automatically stopping the machine in case the magazine 30 becomes empty. Referring to Figs. 16 and 19, it will be noted that the lowermost switch-part 25 held in the magazine 30 rests upon the end of a switch-spring 117 and holds the same out of contact with an opposed switch-spring 118. The circuit for the solenoids 114 may thus also be closed by the switch-spring 117 in case the magazine 30 becomes empty, and the machine will thereupon be automatically stopped by the energization of the solenoids 114 in the manner hereinbefore described. The switch springs 117 and 118 are mounted upon a short bar 119 (see particularly Figs. 1, 2 and 16) which is secured upon the upper ends of the posts 120. Said switch-springs and the parts adjacent thereto are preferably covered over by a casing 121.

The machine may, if desired, be provided with a hand wheel 122 for turning the cam shaft 1 independently of the motor 2, in order that said cam shaft may be slowly turned while various adjustments of the cooperating parts of the machine are being made.

The following is a brief description of the operation of the machine: While the movable parts of the machine are in the position shown in the drawings, one of the switch-parts 25 upon which a contact is to be welded is fed to the work-support or carriage 22 of the reciprocating slide 32. Assuming that the lever 20 is locked in its depressed position, the depression of the lever 14 causes the clutch members 9 and 10 to couple the cam shaft 1 to the motor drive, and said cam shaft makes one complete revolution. At the beginning of this rotation of the shaft 1 the cam 34 carried thereby engages the arm 36 of the carriage operating lever and rocks said lever, the lower end 42 of which is connected to the carriage slide 32. Said slide is thus moved to the rear and the carriage is stopped in position to bring the end of the switch-part 25, carried thereby, beneath the electrode plunger 49. At the same time a slide 79, having a V-shaped notch in its front end, is being moved forward and pushes a previously punched disk 72 out from the die and brings it beneath the switch-part 25 approximately at the same time that said switch-part is brought beneath the plunger 49. The electrode plunger 49, the raising and lowering of which is controlled by the spring 49$^b$, and the cam 97 and lever 96, is then lowered. At this time the circuit of the primary of the transformer is momentarily closed, and the circuit of the secondary being closed through the switch-part 25 and the disk 72, said disk is welded to said switch-part. The plunger 49 is then raised and the arm 37 of the carriage operating lever is acted upon by the cam 35 to move the carriage 22 to the front for the purpose of having another switch-part fed thereto. During this return movement of the carriage the slide 79 is moved to the rear. Also during such return stroke of the slide 32, the ribbon-feed carriage 55 is moved to the right, said carriage having been moved to the left to feed the platinum ribbon during the feed stroke of the slide 32. At approximately the end of the return stroke of the slide 32, the punch 69 is actuated, through the medium of the lever 77 and the cams 78, 78$^a$, to punch out a disk for the next weld. This constitutes a complete cycle of operation of the machine.

What I claim is:—

1. The continuous process of making switch-parts having contacts affixed thereto, which consists in successively punching out disks of contact forming material, feeding said disks successively between the electrodes of the secondary of a transformer, feeding said switch parts successively in superposed relation to said disk between said electrodes, successively closing said electrodes upon a disk and its switch-part as they are fed thereto, and then momentarily closing the circuit of the primary of the transformer.

2. In an electric welding machine, the combination with a rotary shaft and means for driving the same, of a transformer, a pair of relatively movable opposed electrodes constituting the terminals of the secondary of said transformer, means controlled from said shaft for positioning a switch-part and a small platinum disk in superposed relation between said electrodes, means controlled from said shaft for closing said electrodes upon said switch-part and said disk, and switching means controlled by said rotary shaft for momentarily closing the primary circuit of said transformer.

3. In an electric welding machine, the combination with means for punching a small plate from a strip of platinum or other material suitable for contacts, of means for pressing said plate against the surface of a switch-part, and means for passing a welding current through said plate and switch-part.

4. In an electric welding machine, the combination with a pair of relatively movable opposed electrodes constituting the terminals of a source of welding current, of means for punching a small disk from a strip of platinum or other material suitable for switch contacts, means for presenting said disks and a switch-part in superposed relation between said electrodes, and means for closing said electrodes upon said disk and switch-part and for passing a welding current through the same.

5. In an electric welding machine, the combination with a pair of relatively movable opposed electrodes constituting the terminals of a source of welding current, of a reciprocating slide for feeding a switch-part in position between said electrodes, means for punching small plates from a strip of platinum or other material suitable for switch contacts, means operated by said slide for feeding said strip to said punching means, a reciprocating slide for moving a punched out plate into a superposed relation to said switch-part between said electrodes, and means for closing said electrodes upon said disk and switch-part and for passing a welding current through the same.

6. In an electric welding machine, the combination with a cam shaft and means for driving the same, of a transformer, switching means controlled by said cam shaft for momentarily closing the primary circuit of said transformer for each revolution of said cam shaft, relatively movable opposed electrodes constituting the terminals of the secondary of said transformer, a punch for forming a disk from a strip of platinum or the like, a reciprocating slide for moving said disk between said electrodes, a reciprocating carriage for feeding a switch-part between said electrodes in superposed relation to said disk, and cam and lever mechanisms controlled by said cam shaft for operating said slide and said carriage and for closing said electrodes upon said switch-part and disk.

7. In an electric welding machine, a sub-combination comprising a reciprocating slide, and a switch-part supporting carriage mounted on said slide, a portion of said carriage, which is adapted to support a switch part, being yieldingly and adjustably held in a slightly elevated position.

8. In an electric welding machine, a sub-combination comprising a reciprocating slide having a work-support mounted thereon, a ribbon-feed carriage mounted to reciprocate transversely of said slide, a cam carried by said slide and operatively connected to said carriage, and means carried by said carriage for gripping a metallic ribbon in one direction of reciprocation of said carriage.

9. In an electric welding machine, a sub-combination comprising a reciprocating slide having a work-support mounted thereon, a ribbon-feed carriage mounted to reciprocate transversely of said slide, a cam carried by said slide and operatively connected to said carriage, a bracket disposed at an angle to the upper surface of said carriage, and a spring pressed knurled roller mounted beneath said bracket in position to bear upon a platinum ribbon or the like led across the surface of said carriage.

10. In an electric welding machine, a sub-combination comprising a reciprocating slide having a work-support mounted thereon, a source of compressed air having an exit pipe arranged to deliver a blast of air across the path of movement of said work-support to blow the work therefrom, a valve controlling the passage of air through said exit pipe, and means for momentarily opening said valve during the return stroke of said slide.

11. In an electric welding machine, the combination with means for punching a small plate having an elevated portion from a strip of platinum or other material suitable for contacts, of means for pressing the elevated portion of said plate against a switch part, and means for passing a welding current through said plate and switch-part.

12. In an electric welding machine, the combination with means for punching a small plate having a peripheral flange from a strip of platinum or other material suitable for contacts, of means for pressing the flange of said plate against a switch-part, and means for passing a welding current through said plate and switch-part.

In witness whereof, I hereunto subscribe my name this 7th day of October, A. D. 1912.

WILLIAM F. HOSFORD.

Witnesses:
   DAVID LEVINGER,
   CHAS. F. DIETER.